(12) United States Patent
Kim et al.

(10) Patent No.: US 11,887,064 B2
(45) Date of Patent: Jan. 30, 2024

(54) DEEP LEARNING-BASED SYSTEM AND METHOD FOR AUTOMATICALLY DETERMINING DEGREE OF DAMAGE TO EACH AREA OF VEHICLE

(71) Applicant: AGILESODA INC., Seoul (KR)

(72) Inventors: Tae Youn Kim, Seoul (KR); Jin Sol Eo, Hanam-si (KR); Byung Sun Bae, Seoul (KR)

(73) Assignee: AGILESODA INC., Seoul (KR)

( * ) Notice: Subject to any disclaimer, the term of this patent is extended or adjusted under 35 U.S.C. 154(b) by 374 days.

(21) Appl. No.: 17/362,013

(22) Filed: Jun. 29, 2021

(65) Prior Publication Data

US 2021/0327042 A1 Oct. 21, 2021

Related U.S. Application Data

(63) Continuation of application No. PCT/KR2019/018708, filed on Dec. 30, 2019.

(30) Foreign Application Priority Data

| Dec. 31, 2018 | (KR) | 10-2018-0174099 |
| Dec. 31, 2018 | (KR) | 10-2018-0174110 |
| Jul. 3, 2019 | (KR) | 10-2019-0079914 |

(51) Int. Cl.
*G06Q 10/20* (2023.01)
*G06N 3/08* (2023.01)
(Continued)

(52) U.S. Cl.
CPC .......... *G06Q 10/20* (2013.01); *G06F 18/214* (2023.01); *G06F 18/2163* (2023.01); *G06N 3/08* (2013.01);
(Continued)

(58) Field of Classification Search
None
See application file for complete search history.

(56) References Cited

U.S. PATENT DOCUMENTS 9,886,771 B1 * 2/2018 Chen ................... G06F 3/04845
10,817,956 B2 * 10/2020 Zhang ..................... G06N 3/08
(Continued)

FOREIGN PATENT DOCUMENTS

| KR | 10-2015-0070548 A | 6/2015 |
| KR | 10-2016-0134401 A | 11/2016 |
(Continued)

OTHER PUBLICATIONS

Mask R-CNN, Naver blog, MagmaTart/Paper-Reading, Jan. 21, 2018 [Online].
(Continued)

*Primary Examiner* — Anand P Bhatnagar
(74) *Attorney, Agent, or Firm* — Studebaker & Brackett PC

(57) ABSTRACT

The present invention relates to a deep-learning based system and method of automatically determining a degree of damage to each area of a vehicle, which is capable of quickly calculating a consistent and reliable quote for vehicle repair by analyzing an image of a vehicle in an accident by using a deep learning-based Mark R-CNN framework and then extracting a component image corresponding to a damaged part, and automatically determining the degree of damage in the extracted component image based on a pre-trained model.

8 Claims, 7 Drawing Sheets

(51) Int. Cl.
    *G06T 7/00*      (2017.01)
    *G06F 18/214*    (2023.01)
    *G06F 18/21*     (2023.01)
    *G06V 10/764*    (2022.01)
    *G06V 10/82*     (2022.01)
    *G06V 10/44*     (2022.01)

(52) U.S. Cl.
    CPC .......... *G06T 7/0002* (2013.01); *G06V 10/454* (2022.01); *G06V 10/764* (2022.01); *G06V 10/82* (2022.01); *G06T 2207/20081* (2013.01); *G06T 2207/20084* (2013.01); *G06V 2201/08* (2022.01)

(56) References Cited

U.S. PATENT DOCUMENTS

| | | | | |
|---|---|---|---|---|
| 11,144,889 | B2* | 10/2021 | Li | G06T 7/001 |
| 11,151,655 | B1* | 10/2021 | Spader | G06T 1/0007 |
| 11,288,789 | B1* | 3/2022 | Chen | G06T 7/001 |
| 11,361,428 | B1* | 6/2022 | Chen | G06Q 40/08 |
| 11,682,080 | B1* | 6/2023 | Spader | G06V 20/13 |
| | | | | 382/254 |
| 2004/0148188 | A1* | 7/2004 | Uegaki | G06Q 10/06 |
| | | | | 705/305 |
| 2018/0260793 | A1* | 9/2018 | Li | G06Q 40/08 |
| 2023/0230172 | A1* | 7/2023 | Pyle | G06Q 30/0283 |
| | | | | 705/4 |

FOREIGN PATENT DOCUMENTS

KR  10-2018-0118596 A  10/2018
KR  10-2019-0060817 A   6/2019

OTHER PUBLICATIONS

[ML] Representative CNN models—ALexNet, VBGGNet, GoogLeNet, RestNet, Naver Blog, Dec. 23, 2018 [Online].

International Search Report; issued in PCT/KR2019/018708; dated Apr. 13, 2020.

Written Opinion; issued in PCT/KR2019/018708; dated Apr. 13, 2020.

* cited by examiner

FIG. 3
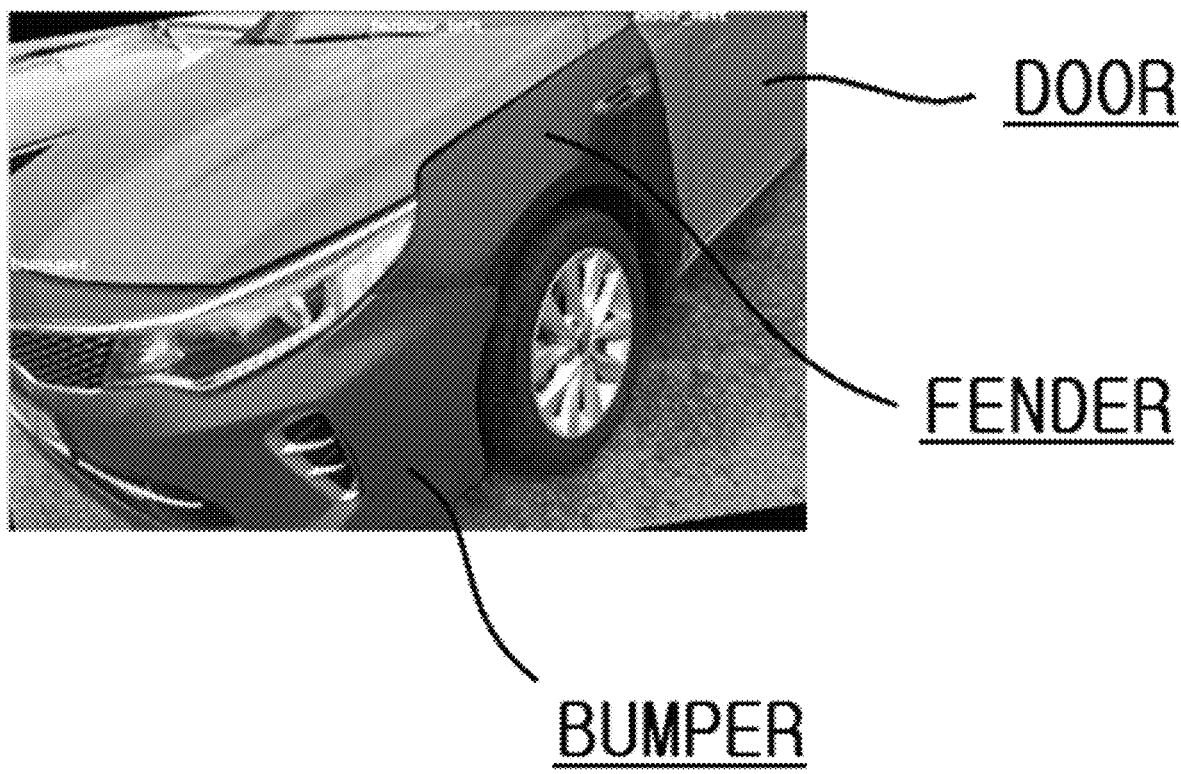

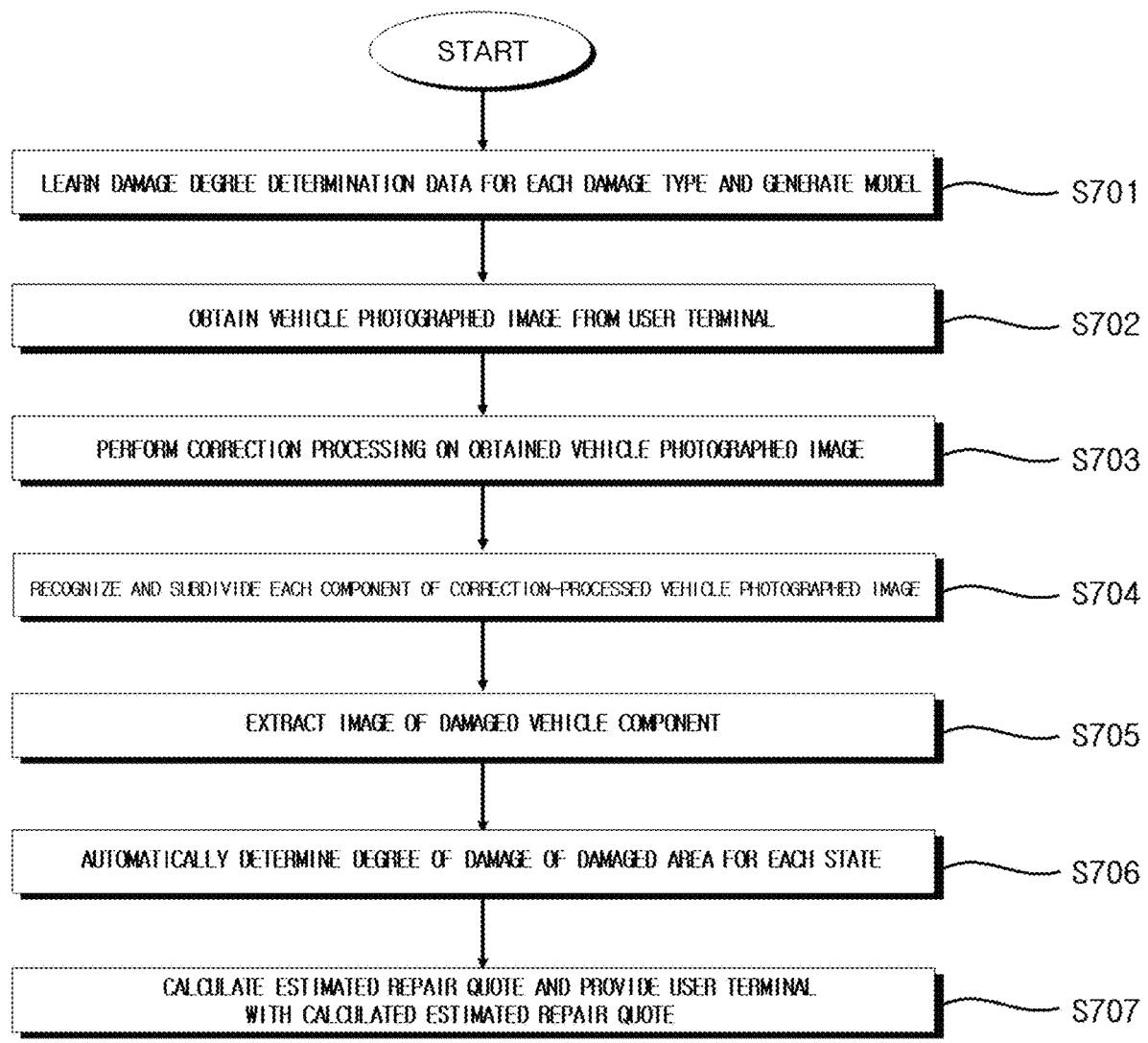

DEEP LEARNING-BASED SYSTEM AND METHOD FOR AUTOMATICALLY DETERMINING DEGREE OF DAMAGE TO EACH AREA OF VEHICLE

CROSS-REFERENCE TO RELATED APPLICATIONS

The present application is a continuation of International Patent Application No. PCT/KR2019/018708, filed on Dec. 30, 2019, which claims priority to and the benefit of Korean Patent Application Nos. 10-2018-0174099, 10-2018-0174110, and 10-2019-0079914 filed in the Korean Intellectual Property Office on Dec. 31, 2018, Dec. 31, 2018, and Jul. 3, 2019, respectively, the entire contents of which are incorporated herein by reference.

TECHNICAL FIELD

The present invention relates to a deep learning-based system and method of automatically determining a degree of damage to each area of a vehicle, and more particularly, to a deep-learning based system and method of automatically determining a degree of damage to each area of a vehicle, which is capable of quickly calculating a consistent and reliable quote for vehicle repair by analyzing an image of a vehicle in an accident by using a deep learning-based Mark R-CNN framework and then extracting a component image corresponding to a damaged part, and automatically determining the degree of damage in the extracted component image based on a pre-trained model.

BACKGROUND ART

In general, when a vehicle is damaged due to various factors, such as a traffic accident, the damaged vehicle is put into a repair shop and the degree of damage of the vehicle is determined according to the determination by a maintenance expert. In this case, because the standard for determining the degree of damage for each maintenance expert is not standardized and subjective determination is involved, there are cases in which repair cost estimates vary greatly even though the degree of damage is similar.

Accordingly, there is a need for technology that can establish reliable repair cost estimates based on standardized and consistent determination standard, not the subjective determination standards for determining the degree of damage of maintenance experts.

DISCLOSURE

Technical Problem

The present invention is conceived to solve the foregoing problems, and is to provide a deep-learning based system and method of automatically determining a degree of damage to each area of a vehicle, which is capable of quickly calculating a consistent and reliable quote for vehicle repair by analyzing an image of a vehicle in an accident by using a deep learning-based Mark R-CNN framework and then extracting a component image corresponding to a damaged part, and automatically determining the degree of damage in the extracted component image based on a pre-trained model.

Technical Solution

An exemplary embodiment of the present invention provides a system for automatically determining a degree of damage for each vehicle area based on deep learning, the system including: a model generating unit which learns subdivided data for each component based on a result of a comparison between a plurality of vehicle photographed images obtained by photographing a state of a vehicle before an accident repair and a plurality of vehicle photographed images obtained by photographing a state of the vehicle after the accident repair, inspects and re-labels damage degree labelling data based on a result of a comparison between the damage degree labelling data for each damage type for the vehicle photographed image and a reference value, and learns data obtained by determining the degree of damage for each damage type of a plurality of damage area photographed images to generate a model; an image pre-processing unit which performs correction-processing on a vehicle photographed image obtained from a user terminal based on the model generated through the model generating unit; a component recognizing unit which recognizes and subdivides the correction-processed vehicle photographed image for each vehicle component based on the model generated through the model generating unit; a damaged area image extracting unit which extracts an image of a damaged vehicle component in the vehicle photographed image; and a damage degree determining unit which determines a degree of damage of the corresponding damaged area according to a predetermined state based on the extracted damaged area image and the model generated through the model generating unit.

In the exemplary embodiment, the image pre-processing unit may perform correction-processing of augmenting an image by rotating or reversing the vehicle photographed image, or perform correction-processing of removing light reflection on the vehicle photographed image.

In the exemplary embodiment, the component recognizing unit may recognize and subdivide vehicle components for a bumper, a door, a fender, a trunk, and a hood in the vehicle photographed image by using a Mask R-CNN framework.

In the exemplary embodiment, the damage degree determining unit may determine whether the degree of damage of the damaged area corresponds to any one of a normal state, a scratch state, a small-damage plate work required state, a medium-damage plate work required state, a large-damage plate work required state, and an exchange state by using an Inception V4 network structure of the CNN framework.

In the exemplary embodiment, the component recognizing unit may mask an area for the bumper, the door, the fender, the trunk, and the hood by using the Mask R-CNN framework, and mask a wider area than an outer line of each area so as to cover a boundary of adjacent areas.

In the exemplary embodiment, the present invention further includes an obtaining unit which obtains the vehicle photographed image from the user terminal.

In the exemplary embodiment, the present invention further includes an estimated repair quote providing unit which calculates an estimated repair quote based on the degree of damage for the damaged area image and provides the user terminal with the calculated estimated repair quote.

Another exemplary embodiment of the present invention provides a method of automatically determining a degree of damage for each vehicle area based on deep learning, the method including: learning, by a model generating unit, subdivided data for each component based on a result of a comparison between a plurality of vehicle photographed images obtained by photographing a state of a vehicle before an accident repair and a plurality of vehicle photographed images obtained by photographing a state of the vehicle after the accident repair, inspecting and re-labelling damage degree labelling data based on a result of a comparison between the damage degree labelling data for each damage type for the vehicle photographed image and a reference value, and learning data obtained by determining the degree of damage for each damage type of a plurality of damage area photographed images to generate a model; performing, by an image pre-processing unit, correction-processing on a vehicle photographed image obtained from a user terminal based on the model generated through the model generating unit; recognizing and subdividing, by a component recognizing unit, the correction-processed vehicle photographed image for each vehicle component based on the model generated through the model generating unit; extracting, by a damaged area image extracting unit, an image of a damaged vehicle component in the vehicle photographed image; and determining, by a damage degree determining unit, a degree of damage of the corresponding damaged area according to a predetermined state based on the extracted damaged area image and the model generated through the model generating unit.

In the exemplary embodiment, the present invention may further include obtaining, by an obtaining unit, the vehicle photographed image from the user terminal.

In the exemplary embodiment, the present invention may further include calculating, by an estimated repair quote providing unit, an estimated repair quote based on the degree of damage for the damaged area image and providing the user terminal with the calculated estimated repair quote.

Advantageous Effects

According to an aspect of the present invention, there is an advantage in that a vehicle owner is capable of quickly obtaining a consistent and reliable quote for vehicle repair based on an accident image photographed by himself/herself.

Further, according to an aspect of the present invention, there is an advantage in that it is possible to quickly derive a damage degree determination result based on a deep learning model trained based on several tens of thousands or more of accident images.

Further, according to an aspect of the present invention, even when a vehicle is damaged due to various reasons, such as a traffic accident, it is not necessary to carry out the process of determining the degree of damage of the vehicle according to the determination by a maintenance expert after putting the damaged vehicle into a repair shop. Accordingly, there is an advantage in that it is possible to effectively prevent the case where the repair cost quote varies greatly despite the similar degree of damage because the standards of determining the degree of damage are not standardized for each maintenance expert and a subjective determination is involved.

DESCRIPTION OF DRAWINGS

FIG. 3 is a diagram illustrating the state in which a vehicle photographed image is recognized and subdivided for each component of the vehicle through a component recognizing unit 130 illustrated in FIG. 1.

FIG. 7 is a diagram illustrating another method of automatically determining a degree of damage to each area of a vehicle through the deep learning-based system 200 for automatically determining the degree of damage to each area of the vehicle illustrated in FIG. 5 in sequence.

MODE FOR CARRYING OUT THE INVENTION

Hereinafter, an exemplary embodiment is presented for helping the understanding of the present invention. However, the following exemplary embodiment is merely provided for easier understanding of the present invention, and the contents of the present invention are not limited by the exemplary embodiment.

Figure 1:
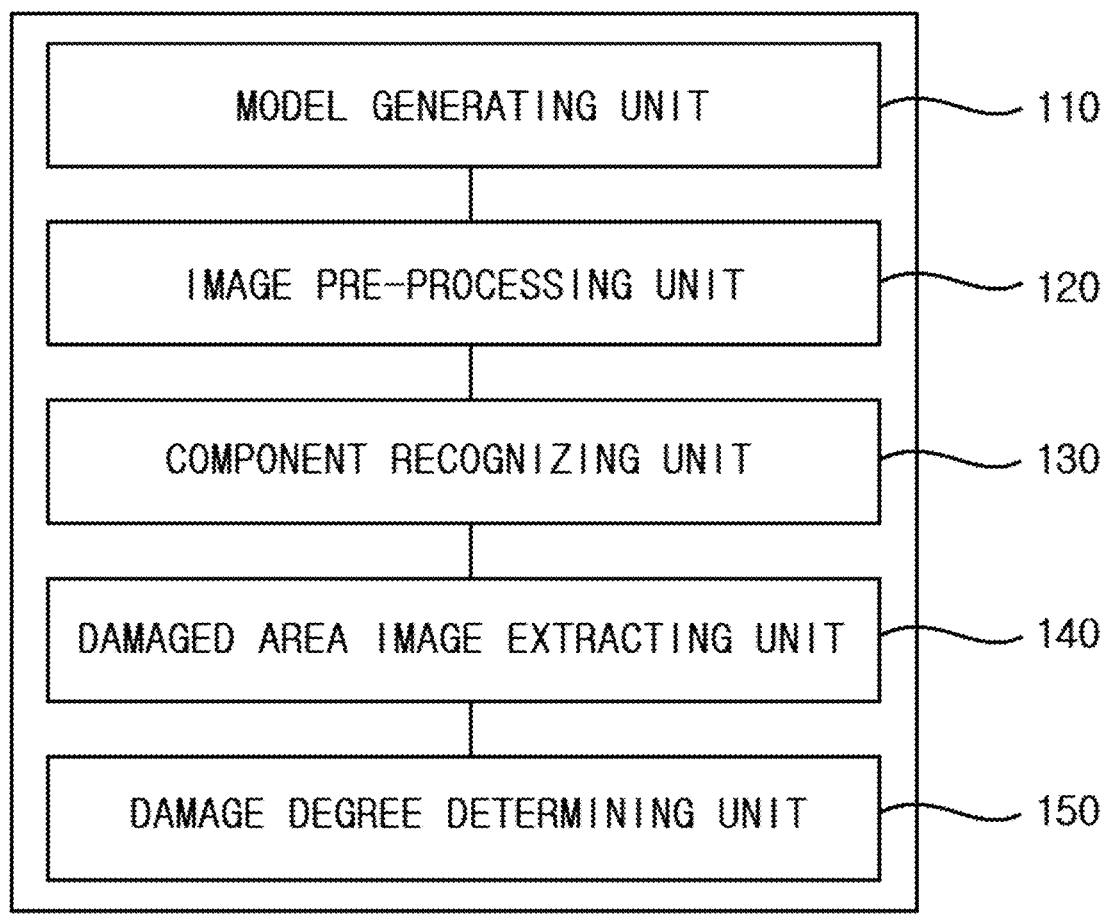
FIG. 1 is a diagram schematically illustrating a configuration of a deep learning-based system 100 for automatically determining a degree of damage to each area of a vehicle according to an exemplary embodiment of the present invention.
Figure 2:
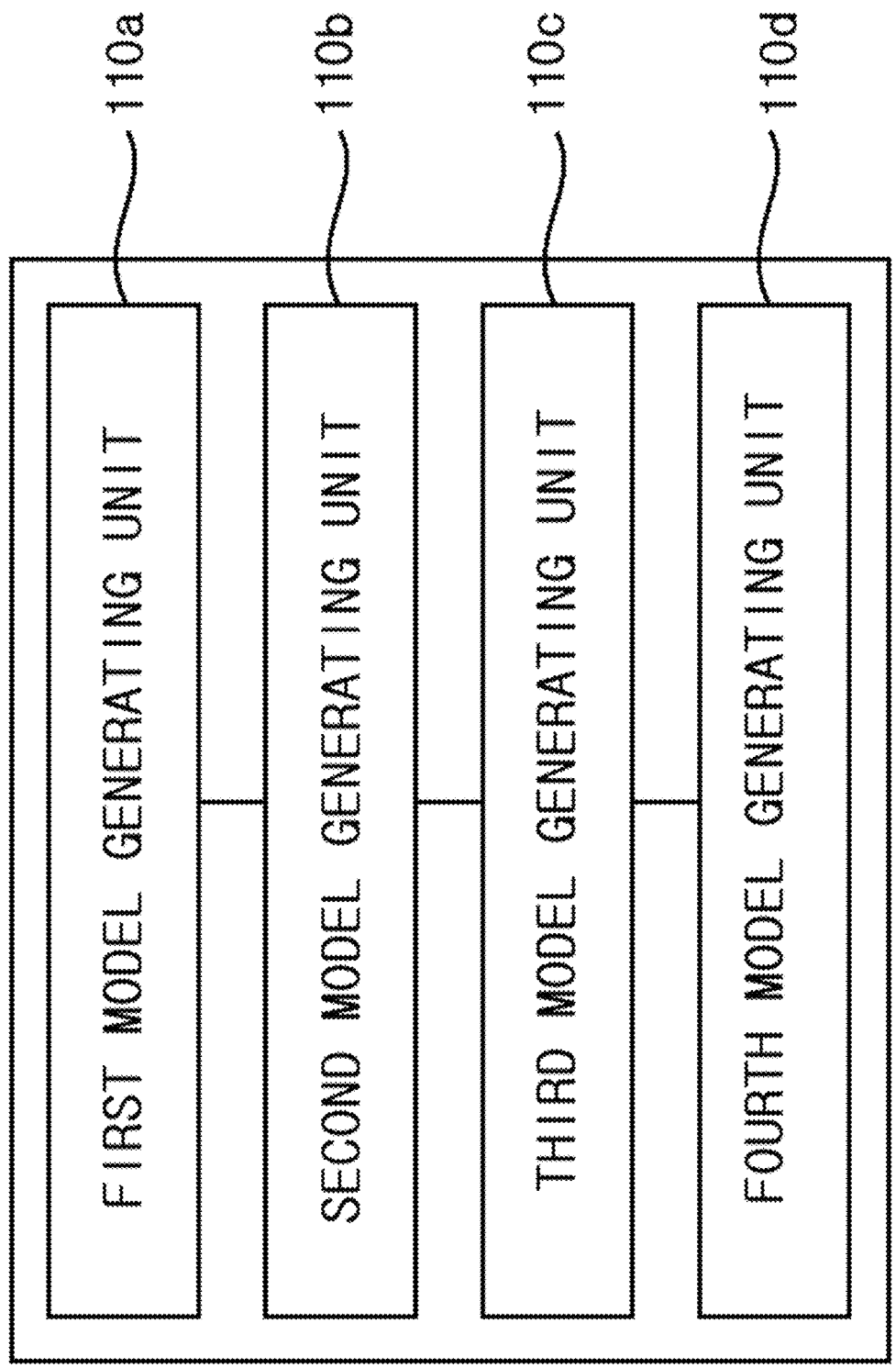
FIG. 2 is a diagram illustrating a configuration of a model generating unit 110 illustrated in FIG. 1.

FIG. 1 is a diagram schematically illustrating a configuration of a deep learning-based system 100 for automatically determining a degree of damage to each area of a vehicle according to an exemplary embodiment of the present invention, and FIG. 2 is a diagram illustrating a configuration of a model generating unit 110 illustrated in FIG. 1.

Referring to FIGS. 1 and 2, the deep learning-based system 100 for automatically determining the degree of damage to each area of the vehicle according to the exemplary embodiment of the present invention may generally include a model generating unit 110, an image pre-processing unit 120, a component recognizing unit 130, a damaged area image extracting unit 140, and a damage degree determining unit 150.

The model generating unit 110 serves to learn subdivided data for each component based on a result of a comparison between a plurality of vehicle photographed images obtained by photographing a state of the vehicle before the accident repair and a plurality of vehicle photographed images obtained by photographing a state of the vehicle after the accident repair, inspect and re-label damage degree labelling data based on a result of a comparison between the damage degree labelling data for each damage type of the vehicle photographed image and a reference value, and learn data obtained by determining the degree of damage for each damage type of the plurality of damage area photographed images to generate a model.

More particularly, the model generating unit 110 may generally include a first model generating unit 110a, a second model generating unit 110b, a third model generating unit 110c, and a fourth model generating unit 110d.

The first model generating unit 110a serves to generate a first model by learning data that selects some vehicle photographed images among the plurality of first vehicle photographed images.

More particularly, the first model generating unit 110a generates a first model by repeatedly learning a process of selecting about 10% (for example, 3 to 4 images) vehicle photographed images by removing an image determined to be photographed after the accident repair or a vehicle photographed image that is out of focus and has an unclear outline because of being photographed too far away among the plurality of first vehicle photographed images (for example, 30 to 40 vehicle photographed images obtained by photographing the accident vehicle in the event of the car accident) based on a result value obtained by comparing a plurality of vehicle photographed images (for example, 50,000 images or more) obtained by photographing the state of the accident vehicle before the accident repair in the event of the vehicle accident with a plurality of vehicle photographed images (for example, 50,000 images or more) obtained by photographing the state of the accident vehicle after the accident repair. This is applicable later to select an image suitable for determining the type of damage and the degree of damage from the plurality of photographed images photographed through a user terminal (for example, a terminal of an owner of the accident vehicle).

The second model generating unit 110b may generate a second model by learning data obtained by recognizing and subdividing each component by using the plurality of second vehicle photographed images.

More particularly, the second model generating unit 110b may learn data obtained by recognizing and subdividing vehicle components for a bumper, a door, a fender, a trunk, and a hood in the plurality of second vehicle photographed images by using the Mask R-CNN framework.

For example, the second model generating unit 110b masks each of the plurality (for example, several tens of thousands) of vehicle photographed images obtained by randomly photographing each part of the front side, the lateral side, and the rear side of the vehicle with different colors for each component, such as the bumper, the door, the fender, the trunk, the hood, and the like through the Mask R-CNN framework, and then learns a location and the type of each component, such as the bumper, the door, the fender, the trunk, and the hood, based on the masked area.

In this case, the masking area does not exactly match the size of each component, such as the bumper, the door, the fender, the trunk, and the hood, but masks an area larger than the size of each component (for example, 110% of the size of each component). Accordingly, the masking is performed so as to cover a boundary of a portion in which the adjacent components are in contact with each other or connected to each other, so that the damage to the boundary portion in which the components are adjacent or connected to each other is also recognized together.

Further, in relation to the component recognized through the Mask R-CNN framework, the masking is performed based on component data pre-learned through at least several tens of thousands or more of sample images for each component type, so that other components, other than the learned component, are not detected.

In the meantime, the mask R-CNN framework is the framework developed by Facebook's artificial intelligence research center, and the type of each component may be recognized by masking the components with different colors for each component by using the Mask R-CNN framework.

The third model generating unit 110c serves to generate a third model which compares damage degree labelling data for each damage type of the damaged area photographed image determined by the user with a reference value, and inspects and relabels the damage degree labelling data in order to obtain the result of determining of the damage type with high reliability for the plurality of vehicle photographed images obtained by photographing the accident vehicle in the event of the car accident.

Herein, the relabeling refers to a process performed on an assumption that the damage level labelling data determined by the user is not perfect due to human error, and the third model serves to inspect the damage degree labelling data.

First, the third model generating unit 110c generates the third model which outputs a probability of the damaged area estimated to correspond to the corresponding image when a damaged area is classified from a specific damaged area photographed image as result data.

In this case, in order to improve accuracy of the corresponding third model, the third model generating unit 110c determines whether a probability value of the damaged area of the result data output according to the input of the specific damaged area photographed image to the third model is larger or smaller than a reference probability value that is set with a predetermined probability value. In this case, the probability value may be output with a numerical value, such as a percentage (%) or a predetermined constant value.

When the probability value of the damaged area of the specific damaged area photographed image is larger than the reference probability value, it is determined that the accuracy of the generated third model is high. In this case, the damage degree labelling data assigned to the corresponding damaged area photographed images by the user is maintained.

On the contrast, when the probability value of the damaged area of the specific damaged area photographed image is smaller than the reference probability value, it is determined that the accuracy of the generated third model is low. In this case, the damage degree labelling data assigned to the corresponding damaged area photographed image by the user is corrected to new damaged degree labelling data.

Through the foregoing method, the relabeling process is performed on all of the damaged area photographed images, so that it is possible to improve the rate of determination of the degree of damage in the damage area photographed image, and whenever the relabeling process is repeatedly performed, performance of the third model is continuously improved. The third model exhibiting the finally improved performance is applicable to the training of a fourth model which is to be described below.

Further, in the exemplary embodiment, in the relabeling process through the third model generating unit 110c, the fourth model generating unit 110d which is to be described below may use a softmax value generated through the third model generating unit 110c.

The fourth model generating unit 110d serves to generate a fourth model by learning data obtained by determining the degree of damage for each damage type of the plurality of damaged area photographed images.

More particularly, the fourth model generating unit 110d generates the fourth model by repeatedly learning the degree of damage for each damage type based on the plurality (for example, several tens of thousand) of damaged area photographed images (for example, doors with scratches, the fender that needs plate work, and the bumper that needs replacement work). In this case, the fourth model generating unit 110d determines whether the degree of damage of the corresponding damaged area corresponds to any one of a normal state, a scratch state, a small-damage plate work required state, a medium-damage plate work required state, a large-damage plate work required state, and an exchange state by using the Inception V4 network structure of the CNN framework.

In this case, the Inception V4 network structure is developed by the Google's artificial intelligence research center, and the fourth model generating unit learns whether the damaged area corresponds to any one of the normal state, the scratch state, the small-damage plate work required state, the medium-damage plate work required state, the large-damage plate work required state, and the exchange state by using the Inception V4 network structure.

Next, the image pre-processing unit 120 performs various correction processing on the vehicle photographed image obtained by photographing the vehicle with a camera photographing function equipped in the user terminal (for example, the portable terminal of the owner of the accident vehicle) based on the model generated through the model generating unit 110, thereby improving damage degree determination accuracy or recognition rate through the damage degree determining unit 150 which is to be described below.

The image pre-processing unit 120 standardizes an image size by augmenting or resizing the image to a predetermined size recognizable by the component recognizing unit 130 which is to be described below by rotating or reversing the vehicle photographed image photographed through the user terminal. Further, through the correction processing of removing light reflection of a surface of the component, the image pre-processing unit 120 removes a recognition error of the vehicle photographed image due to the light reflection to improve accuracy.

The component recognizing unit 130 performs masking with a different color on each component and then recognizes and subdivides each vehicle component based on the model generated through the model generating unit 110 in order to recognize each component in the vehicle photographed image which is correction-processed through the image pre-processing unit 120. This will be described in more detail with reference to FIG. 3.

FIG. 3 is a diagram illustrating the state in which a vehicle photographed image is recognized and fragmented for each component of the vehicle through the component recognizing unit 130 illustrated in FIG. 1.

Referring to FIG. 3, the component recognizing unit 130 recognizes and subdivides the component positions of the bumper, the door, the fender, the trunk, the hood, and the like in the vehicle photographed image by using the Mask R-CNN framework.

In this case, a different color is masked in each component of the bumper, the door, the fender, the trunk, the hood, and the like through the Mask R-CNN framework, and in this case, the masking area does not exactly match the size of each component, such as the bumper, the door, the fender, the trunk, and the hood, but masks an area larger than the size of each component (for example, 110% of the size of each component). Accordingly, the masking is performed so as to cover a boundary of a portion in which the adjacent components are in contact with each other or connected to each other, so that the damage to the boundary portion in which the components are adjacent or connected to each other is also recognized.

In this case, in relation to the component recognized through the Mask R-CNN framework, the masking is performed based on the components pre-learned through at least several tens of thousands or more of sample images for each component type, so that other components, other than the learned component, are not detected.

In the meantime, the Mask R-CNN framework is the framework developed by Facebook's artificial intelligence research center, and the type of each component may be recognized by masking the components with different colors for each component by using the Mask R-CNN framework.

Referring back to FIG. 1, the damaged area image extracting unit 140 serves to extract an image of a damaged vehicle component in the vehicle photographed image in which the type and the location for each vehicle component are recognized through the component recognizing unit 130. This will be described in more detail with reference to FIG. 4.

Figure 4:
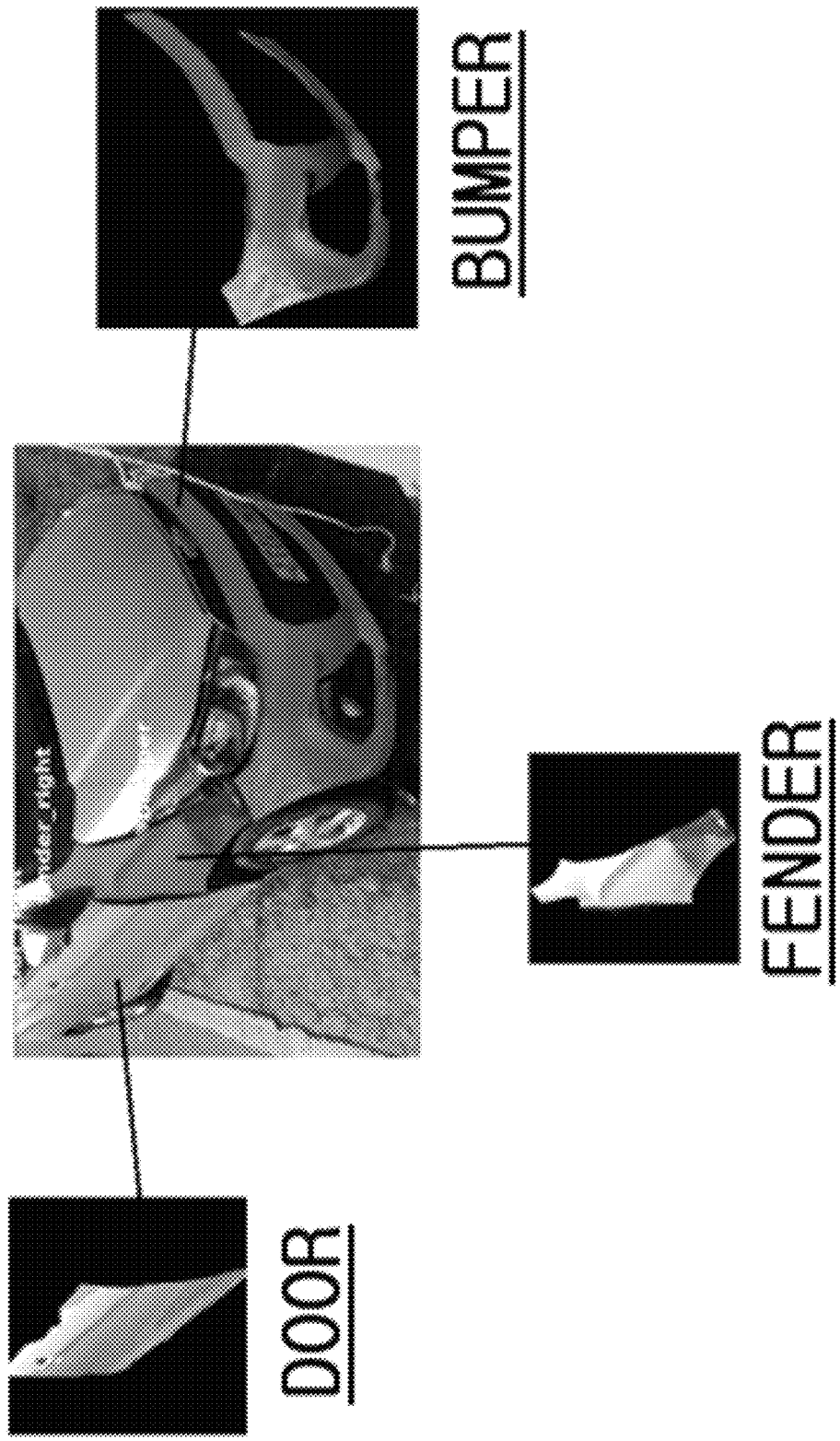
FIG. 4 is a diagram illustrating the state where an image of a damaged vehicle component is extracted through a damaged area image extracting unit 140 illustrated in FIG. 1.

FIG. 4 is a diagram illustrating the state where an image of a damaged vehicle component is extracted through the damaged part image extracting unit 140 illustrated in FIG. 1.

Referring to FIG. 4, the damaged part image extracting unit 140 processes all of the peripheral portions (background) in black, other than the vehicle component, based on an outer line in the image for the vehicle component obtained through the masking in the component detecting unit 120 (or processed with different colors so as to make the component stand out) to accurately extract a damaged area image. Through this, when the damage degree determining unit 150, which is to be described below, determines the degree of damage, determination accuracy is increased.

Referring back to FIG. 1, the damage degree determining unit 150 determines the degree of damage (depth of damage) of the damaged area image extracted through the damaged area image extracting unit 140 based on the model generated through the model generating unit 110, and determines whether the corresponding damaged area corresponds to any one of the normal state, the scratch state, the small-damage plate work required state, the medium-damage plate work required state, the large-damage plate work required state, and the exchange state by using the Inception V4 network structure of the CNN framework.

For example, the damage degree determining unit 150 automatically determines the state of the damaged area image by comparing the shapes learned based on several tens of thousands or more of sample damaged images with the damaged area image through the deep learning-based Inception V4 network structure (Inception V4 convolution neural network structure).

In this case, for example, the scratch state may be determined based on the shapes learned based on the several tens of thousands or more of sample damaged images corresponding to 30 minutes or shorter of the repair time, the small-damage plate work required state may be determined based on the shapes learned based on the several tens of thousands or more of sample damaged images corresponding to about 1.3 hours or shorter of the repair time, the medium-damage plate work required state may be determined based on the shapes learned based on the several tens of thousands or more of sample damaged images corresponding to about 1.7 hours or shorter of the repair time, and the large-damage plate work required state may be determined based on the shapes learned based on the several tens of thousands or more of sample damaged images corresponding to about 2.3 hours or shorter of the repair time.

In this case, the Inception V4 network structure is developed by the Google's artificial intelligence research center, and the damage degree determining unit 150 may determine whether the damaged area corresponds to any one of the normal state, the scratch state, the small-damage plate work required state, the medium-damage plate work required state, the large-damage plate work required state, and the exchange state by using the Inception V4 network structure.

Further, the image pre-processing unit 120, the component recognizing unit 130, the damaged area image extracting unit 140, and the damage degree determining unit 150 recognize a learning environment of the model and the components learned through the plurality of sample images, extracts the damaged area image, and independently implements an execution environment of the model determining the degree of damage by using a model server provided from the TensorFlow, thereby making a training result of the trained model be reflected to the execution environment in real time. In this case, the learning speed of the learned model and the execution speed of the execution model may be dramatically improved through the plurality of GPUs.

In the exemplary embodiment, the vehicle photographed images obtained through the image pre-processing unit 120 may be divided based on the model obtained by learning data of some selected vehicle photographed images among the plurality of vehicle photographed images.

For example, the model in this case is generated by repeatedly learning data selecting about 10% (for example, 3 to 4 images) vehicle photographed images by removing an image determined to be photographed after the accident repair or a vehicle photographed image that is out of focus and has an unclear outline because of being photographed too far away among the plurality of first vehicle photographed images (for example, 30 to 40 vehicle photographed images obtained by photographing the accident vehicle in the event of the car accident) based on a result value obtained by comparing a plurality of vehicle photographed images (for example, 50,000 images or more) obtained by photographing the state of the accident vehicle before the accident repair in the event of the vehicle accident with a plurality of vehicle photographed images (for example, 50,000 images or more) obtained by photographing the state of the accident vehicle after the accident repair. The model is applicable to select an image suitable for determining the type of damage and the degree of damage from the plurality of photographed images photographed through a user terminal (for example, a terminal of an owner of the accident vehicle).

In the meantime, in the exemplary embodiment, when the present invention receives a request for an immediate estimated repair quote for the vehicle photographed image from the user terminal, the present invention may transmit an estimated repair quote result corresponding to the corresponding request for the estimated repair quote to the user terminal, and this will be described below.

Figure 5:
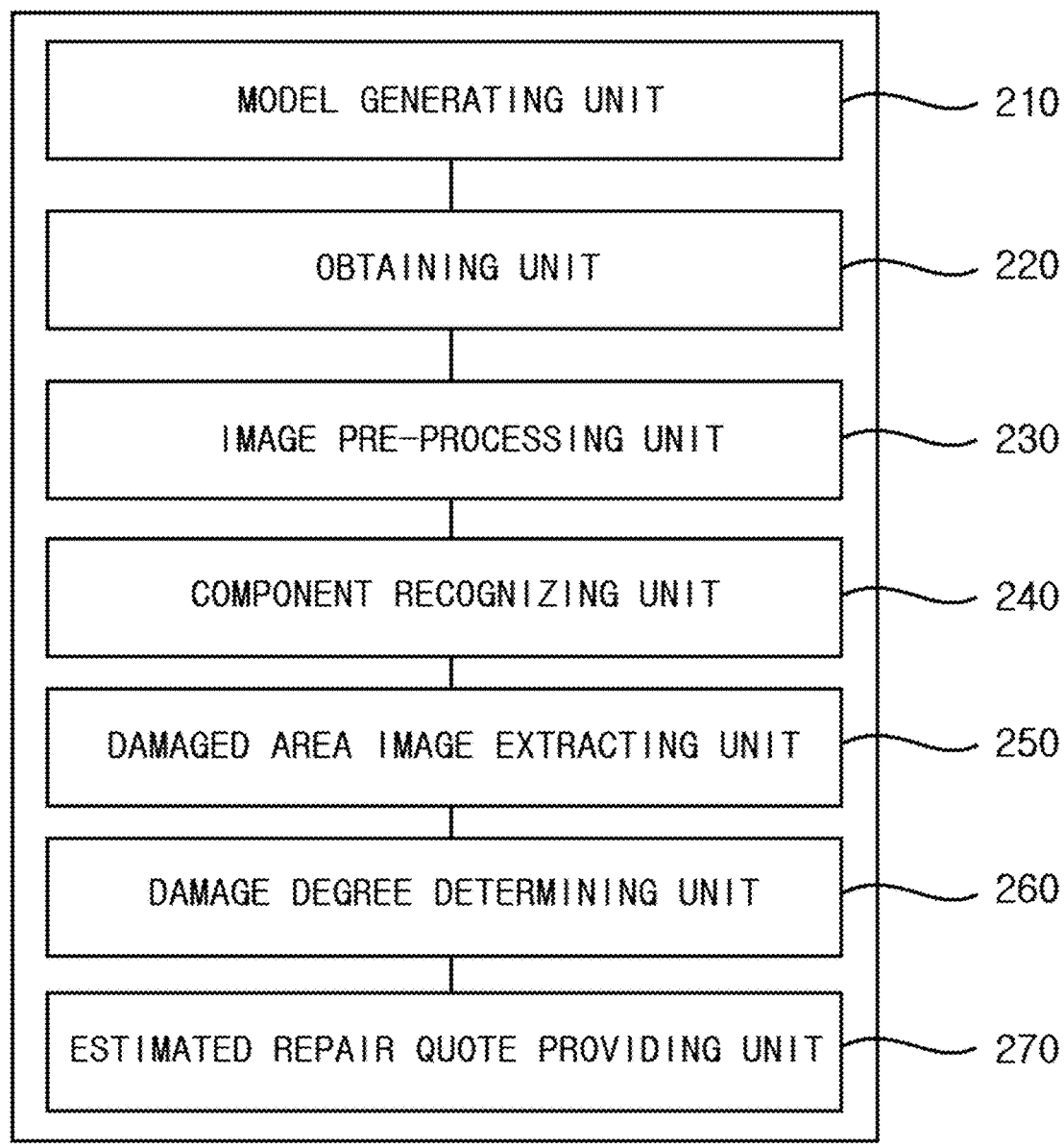
FIG. 5 is a diagram schematically illustrating a configuration of a deep learning-based system 200 for automatically determining a degree of damage to each area of a vehicle according to another exemplary embodiment of the present invention.

FIG. 5 is a diagram schematically illustrating a configuration of a deep learning-based system 200 for automatically determining a degree of damage to each area of a vehicle according to another exemplary embodiment of the present invention.

Referring to FIG. 5, compared to FIG. 1, the deep learning-based system 200 for automatically determining a degree of damage to each area of a vehicle according to another exemplary embodiment of the present invention includes an obtaining unit 220 which obtains a vehicle photographed image from a user terminal, and an estimated repair quote providing unit 270 which calculates an estimated repair quote based on the degree of damage for a damaged area image and provides the user terminal with the calculated estimated repair quote again.

More particularly, the obtaining unit 220 serves to obtain the vehicle photographed image from the user terminal, and receives a request for an estimated repair quote through the corresponding vehicle photographed image.

The image pre-processing unit 230, the component recognizing unit 240, the damaged area image extracting unit 250, and the damage degree determining unit 260 correspond to the image pre-processing unit 120, the component recognizing unit 130, the damaged area image extracting unit 140, and the damage degree determining unit 150 which have been described with reference to FIG. 1, so that the detailed description thereof will be omitted.

The estimated repair quote providing unit 270 numerically calculates the degree of damage of the damaged area determined through the damage information determining unit 260, and then calculates an estimated repair quote based on the numerically calculated degree of damage and provides the user terminal with the calculated estimated repair quote again.

Next, a method of automatically determining a degree of damage to each area of a vehicle through the present invention will be described in sequence with reference to FIGS. 6 and 7.

Figure 6:
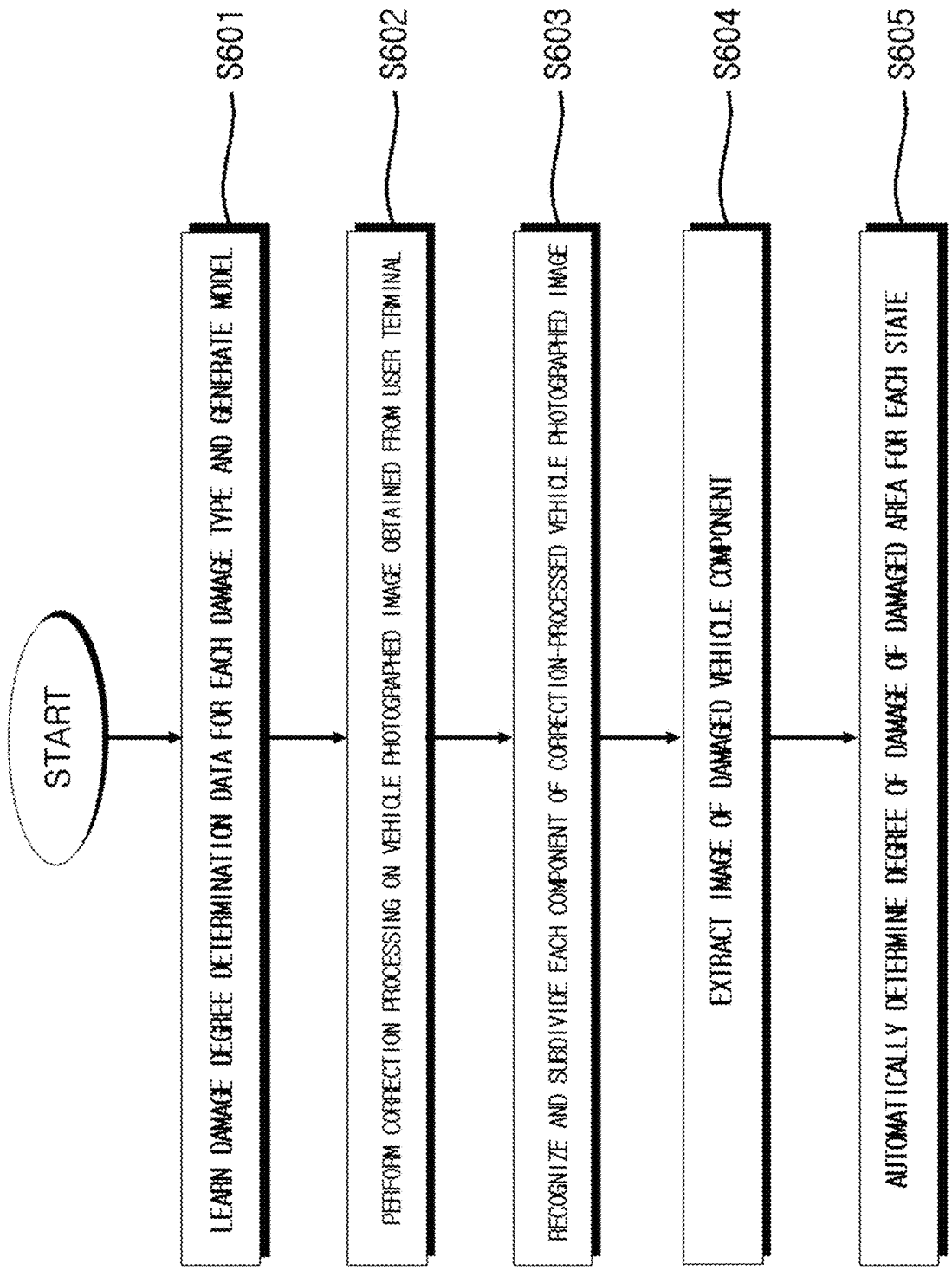
FIG. 6 is a diagram illustrating a method of automatically determining a degree of damage to each area of a vehicle through the deep learning-based system 100 for automatically determining the degree of damage to each area of the vehicle illustrated in FIG. 1 in sequence.

FIG. 6 is a diagram illustrating a method of automatically determining a degree of damage to each area of a vehicle through the deep learning-based system 100 for automatically determining the degree of damage to each area of the vehicle illustrated in FIG. 1 in sequence.

Referring to FIG. 6, first, the model generating unit learns subdivided data for each component based on a result of a comparison between a plurality of vehicle photographed images obtained by photographing a state of the vehicle before the accident repair and a plurality of vehicle photographed images obtained by photographing a state of the vehicle after the accident repair, inspects and re-labels damage degree labelling data based on a result of a comparison between the damage degree labelling data for each damage type of the vehicle photographed image and a reference value, and learns data obtained by determining the degree of damage for each damage type of the plurality of damage area photographed images to generate a model (S601).

Next, the image pre-processing unit performs correction processing on the vehicle photographed image obtained from a user terminal (S602). In this operation, the image pre-processing unit standardizes an image size by augmenting the image to a predetermined size recognizable by the component recognizing unit by rotating or reversing the vehicle photographed image, and removes a recognition error of the vehicle photographed image through the correction processing of removing light reflection to improve accuracy.

Next, the component recognizing unit recognizes and subdivides the correction-processed vehicle photographed image for each vehicle component (S603). In this operation, the component recognizing unit recognizes and subdivides component positions of a bumper, a door, a fender, a trunk, a hood, and the like in the vehicle photographed image by using the Mask R-CNN framework.

Next, the damaged area image extracting unit extracts only an image of a damaged vehicle component in the vehicle photographed image (S604). In this operation, the damaged part image extracting unit processes all of the peripheral portions (background) in black, other than the vehicle component, based on an outer line in the image for the vehicle component obtained through the masking in the component detecting unit to accurately extract a damaged area image.

Next, the damage degree determining unit divides the degree of damage of the corresponding damaged area based on the extracted damaged area image to 6 states and determines the degree of damage (S605). In this case, the damage degree determining unit determines whether the degree of damage of the corresponding damaged area corresponds to any one of a normal state, a scratch state, a small-damage plate work required state, a medium-damage plate work required state, a large-damage plate work required state, and an exchange state by using the Inception V4 network structure of the CNN framework.

FIG. 7 is a diagram illustrating another method of automatically determining a degree of damage to each area of a vehicle through the deep learning-based system 200 for automatically determining the degree of damage to each area of the vehicle illustrated in FIG. 5 in sequence.

Referring to FIG. 7, first, the model generating unit learns subdivided data for each component based on a result of a comparison between a plurality of vehicle photographed images obtained by photographing a state of the vehicle before the accident repair and a plurality of vehicle photographed images obtained by photographing a state of the vehicle after the accident repair, inspects and re-labels damage degree labelling data based on a result of a comparison between the damage degree labelling data for each damage type of the vehicle photographed image and a reference value, and learns data obtained by determining the degree of damage for each damage type of the plurality of damage area photographed images to generate a model (S701).

Next, the obtaining unit obtains a vehicle photographed image from a user terminal, and also receives a request for an estimated repair quote through the corresponding vehicle photographed image (S702).

Next, the image pre-processing unit performs correction processing on the vehicle photographed image obtained from a user terminal (S703). In this operation, the image pre-processing unit standardizes an image size by augmenting the image to a predetermined size recognizable by the component recognizing unit by rotating or reversing the vehicle photographed image, and removes a recognition error of the vehicle photographed image through the correction processing of removing light reflection to improve accuracy.

Next, the component recognizing unit recognizes and subdivides the correction-processed vehicle photographed image for each vehicle component (S704). In this operation, the component recognizing unit recognizes and subdivides component positions of a bumper, a door, a fender, a trunk, a hood, and the like in the vehicle photographed image by using the Mask R-CNN framework.

Next, the damaged area image extracting unit extracts only an image of a damaged vehicle component in the vehicle photographed image (S705). In this operation, the damaged part image extracting unit processes all of the peripheral portions (background) in black, other than the vehicle component, based on an outer line in the image for the vehicle component obtained through the masking in the component detecting unit to accurately extract a damaged area image.

Next, the damage degree determining unit divides the degree of damage of the corresponding damaged area based on the extracted damaged area image to 6 states and determines the degree of damage (S706). In this case, the damage degree determining unit determines whether the degree of damage of the corresponding damaged area corresponds to any one of a normal state, a scratch state, a small-damage plate work required state, a medium-damage plate work required state, a large-damage plate work required state, and an exchange state by using the Inception V4 network structure of the CNN framework.

Next, the estimated repair quote providing unit calculates an estimated repair quote based on the degree of damage or the damaged area image and then provides the user terminal with the calculated estimated repair quote (S707).

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. A system for automatically determining a degree of damage for each vehicle area based on deep learning, the system comprising:
    a model generating unit which compares a plurality of vehicle photographed images obtained by photographing a state of the vehicle before an accident repair and a plurality of vehicle photographed images obtained by photographing a state of the vehicle after the accident repair, masks each component with a different color, learns subdivided data for the vehicle component for a bumper, a door, a fender, a trunk, and a hold based on the masked area, inspects and re-labels damage degree labelling data based on a result of a comparison between the damage degree labelling data for each damage type for the vehicle photographed image and a reference value, and learns data obtained by determining the degree of damage for each damage type of a plurality of damage area photographed images to generate a model;
    an image pre-processing unit which performs correction-processing on a vehicle photographed image obtained from a user terminal based on the model generated through the model generating unit;
    a component recognizing unit which recognizes and subdivides the correction-processed vehicle photographed image for each vehicle component based on the model generated through the model generating unit;
    a damaged area image extracting unit which extracts an image of a damaged vehicle component in the vehicle photographed image; and
    a damage degree determining unit which determines a degree of damage of the corresponding damaged area according to a predetermined state based on the extracted damaged area image and the model generated through the model generating unit.

2. The system of claim 1, wherein the image pre-processing unit performs correction-processing of augmenting an image by rotating or reversing the vehicle photographed image, or performs correction-processing of removing light reflection on the vehicle photographed image.

3. The system of claim 1, wherein the component recognizing unit recognizes and subdivides vehicle components for a bumper, a door, a fender, a trunk, and a hood in the vehicle photographed image by using a Mask R-CNN framework.

4. The system of claim 1, wherein the damage degree determining unit determines whether the degree of damage of the damaged area corresponds to any one of a normal state, a scratch state, a small-damage plate work required state, a medium-damage plate work required state, a large-damage plate work required state, and an exchange state by using an Inception V4 network structure of the CNN framework.

5. The system of claim 3, wherein the component recognizing unit masks an area for the bumper, the door, the fender, the trunk, and the hood by using the Mask R-CNN framework, and masks a wider area than an outer line of each area so as to cover a boundary of adjacent areas.

6. The system of claim 1, further comprising:
an estimated repair quote providing unit which calculates an estimated repair quote based on the degree of damage for the damaged area image and provides the user terminal with the calculated estimated repair quote.

7. A method of automatically determining a degree of damage for each vehicle area based on deep learning, the method comprising:
comparing, by a model generating unit, a plurality of vehicle photographed images obtained by photographing a state of the vehicle before an accident repair and a plurality of vehicle photographed images obtained by photographing a state of the vehicle after the accident repair, masking each component with a different color, learning subdivided data for the vehicle component for a bumper, a door, a fender, a trunk, and a hold based on the masked area, inspecting and re-labelling damage degree labelling data based on a result of a comparison between the damage degree labelling data for each damage type for the vehicle photographed image and a reference value, and learning data obtained by determining the degree of damage for each damage type of a plurality of damage area photographed images to generate a model;

performing, by an image pre-processing unit, correction-processing on a vehicle photographed image obtained from a user terminal based on the model generated through the model generating unit;

recognizing and subdividing, by a component recognizing unit, the correction-processed vehicle photographed image for each vehicle component based on the model generated through the model generating unit;

extracting, by a damaged area image extracting unit, an image of a damaged vehicle component in the vehicle photographed image; and determining, by a damage degree determining unit, a degree of damage of the corresponding damaged area according to a predetermined state based on the extracted damaged area image and the model generated through the model generating unit.

8. The method of claim 7, further comprising:
calculating, by an estimated repair quote providing unit, an estimated repair quote based on the degree of damage for the damaged area image and providing the user terminal with the calculated estimated repair quote.

* * * * *